(12) United States Patent
Wu et al.

(10) Patent No.: US 12,224,786 B2
(45) Date of Patent: Feb. 11, 2025

(54) DYNAMIC TUNING METHOD FOR SAR AND USER EQUIPMENT THEREOF

(71) Applicant: MEDIATEK INC., Hsinchu (TW)

(72) Inventors: Chun-Yen Wu, Hsinchu (TW); Cheng-Han Lee, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 387 days.

(21) Appl. No.: 17/930,501

(22) Filed: Sep. 8, 2022

(65) Prior Publication Data

US 2024/0088930 A1    Mar. 14, 2024

(51) Int. Cl.
*H04W 52/36*     (2009.01)
*H04B 1/3827*     (2015.01)

(52) U.S. Cl.
CPC .......... *H04B 1/3838* (2013.01); *H04W 52/36* (2013.01)

(58) Field of Classification Search
CPC .... H04B 1/3827; H04B 1/3838; H04W 52/36
See application file for complete search history.

(56) References Cited

U.S. PATENT DOCUMENTS

| | | | | |
|---|---|---|---|---|
| 11,309,924 B1 * | 4/2022 | Hoirup | ................. | H04B 1/1036 |
| 11,490,338 B1 * | 11/2022 | Khawand | ............ | H04W 52/285 |
| 11,678,275 B2 * | 6/2023 | Ramasamy | ........... | H04W 52/42 |
| | | | | 455/522 |
| 11,700,581 B2 * | 7/2023 | Regunathan | ........ | H04W 52/146 |
| | | | | 370/316 |
| 2002/0123345 A1 * | 9/2002 | Mahany | ................ | H04W 84/18 |
| | | | | 455/432.1 |
| 2014/0022125 A1 * | 1/2014 | Zhu | ....................... | H01Q 3/2611 |
| | | | | 342/368 |
| 2014/0024321 A1 * | 1/2014 | Zhu | .......................... | H04B 1/18 |
| | | | | 455/77 |
| 2015/0094914 A1 * | 4/2015 | Abreu | ................ | B60H 1/00742 |
| | | | | 701/1 |
| 2015/0148681 A1 * | 5/2015 | Abreu | ................... | A61B 5/6821 |
| | | | | 600/474 |
| 2015/0333706 A1 * | 11/2015 | Blednov | ............. | H04B 1/0483 |
| | | | | 455/114.3 |
| 2016/0128069 A1 * | 5/2016 | Bodduru | ............ | H04L 43/0823 |
| | | | | 370/252 |
| 2016/0241276 A1 * | 8/2016 | Zhu | ....................... | H04W 52/30 |
| 2020/0351795 A1 * | 11/2020 | Regunathan | ....... | H04B 7/18517 |
| 2021/0250775 A1 * | 8/2021 | Hardin | ................ | H04W 52/367 |
| 2022/0078722 A1 * | 3/2022 | Lee | ...................... | H04B 17/103 |
| 2022/0116949 A1 * | 4/2022 | Nadakuduti | ........ | H04W 52/346 |
| 2022/0123768 A1 * | 4/2022 | Hoirup | ................ | H04B 1/1036 |
| 2022/0132434 A1 * | 4/2022 | Lee | ...................... | H04L 5/0048 |

(Continued)

FOREIGN PATENT DOCUMENTS

| | | | | | |
|---|---|---|---|---|---|
| CN | 114040489 A | * | 2/2022 | ............ | H04W 52/24 |
| EP | 3949175 B1 | * | 5/2023 | ........... | H04B 17/102 |
| EP | 4174516 A1 | * | 5/2023 | ........... | G01S 13/003 |

*Primary Examiner* — Hai V Nguyen
(74) *Attorney, Agent, or Firm* — McClure, Qualey & Rodack, LLP (57) ABSTRACT

Dynamic tuning method for a specific absorption rate (SAR) is provided. The dynamic tuning method is applied to user equipment (UE). The dynamic tuning method may include the following steps: the UE may determine the back-off value corresponding to the current antenna state; and the UE may tune the conducted power of the radio frequency (RF) circuit of the UE based on the back-off value.

20 Claims, 5 Drawing Sheets

(56) References Cited

U.S. PATENT DOCUMENTS

| | | | |
|---|---|---|---|
| 2022/0150847 A1* | 5/2022 | Lee | H04M 1/0245 |
| 2022/0201621 A1* | 6/2022 | Meyuhas | H04B 1/3838 |
| 2022/0210844 A1* | 6/2022 | MolavianJazi | H04W 74/0841 |
| 2022/0225244 A1* | 7/2022 | Lee | H04B 7/0404 |
| 2022/0286980 A1* | 9/2022 | Lee | H04M 1/02 |
| 2023/0021654 A1* | 1/2023 | Ramasamy | H04W 52/42 |
| 2023/0139016 A1* | 5/2023 | Nadakuduti | H04W 52/283 |
| | | | 370/318 |
| 2023/0189166 A1* | 6/2023 | Agarwal | H04W 52/143 |
| | | | 370/318 |
| 2023/0318637 A1* | 10/2023 | Yoo | H04B 1/0458 |
| | | | 455/552.1 |
| 2023/0337146 A1* | 10/2023 | Kuo | H04W 52/283 |
| 2023/0396279 A1* | 12/2023 | Lu | H04W 52/34 |
| 2023/0417869 A1* | 12/2023 | Svendsen | H04B 1/40 |
| 2024/0072835 A1* | 2/2024 | Wu | H04B 1/3838 |

* cited by examiner

DYNAMIC TUNING METHOD FOR SAR AND USER EQUIPMENT THEREOF

BACKGROUND OF THE INVENTION

Field of the Invention

The invention generally relates to time-average specific absorption rate (SAR) technology, and more particularly, to a SAR technology in which the conducted power of the UE is tuned based on the back-off value.

Description of the Related Art

Specific absorption rate (SAR) testing is a measure of the rate at which energy is absorbed per unit mass by a human body when exposed to a radio frequency (RF) electromagnetic field. In the SAR regulation, the exposure power limitation over the time period is specified, i.e., time-average SAR. The radiated power of user equipment (UE) within the unit of time cannot be over the power limitation.

However, in order to follow the limitations of the SAR regulation, in conventional methods, the back-off power for all antenna states may be fixed. As a result, user experience may be suffered over the time period specified in the SAR regulation.

Therefore, how to give consideration between meeting the limitations of the SAR regulation and improving user experience is a topic that is worthy of discussion.

BRIEF SUMMARY OF THE INVENTION

A dynamic tuning method and UE for a specific absorption rate (SAR) are provided to overcome the problems mentioned above. The UE can tune the conducted power of a radio frequency (RF) circuit of the UE based on the back-off value corresponding to a current antenna state to maintain the transmission performance of the UE without exceeding the SAR requirements of the SAR regulation.

An embodiment of the invention provides a dynamic tuning method for a specific absorption rate (SAR). The dynamic tuning method is applied to a user equipment (UE). The dynamic tuning method may include the following steps: the UE may determine a back-off value corresponding to a current antenna state; and the UE may tune the conducted power of the radio frequency (RF) circuit of the UE based on the back-off value.

In some embodiments, different antenna states correspond to different back-off values.

In some embodiments, back-off value is determined based on a back-off table and the back-off table records each back-off value corresponding to each antenna state and the back-off table is stored in a memory device of the UE.

In some embodiments, the transmission performance comprises the total radiated power (TRP) value.

In some embodiments, each usage scenario corresponds to one or more antenna states. In an embodiment, the back-off values of the antenna states are determined based on a SAR LAB test. In another embodiment, the first back-off value of the first antenna state with the best antenna performance within all the antenna states is determined based on a SAR LAB test, and the back-off values of other antenna states are determined based on the first back-off value.

In some embodiments, in the dynamic tuning method, a switch circuit of the UE switches to the current antenna state. In some embodiments, the switch circuit comprises at least one of an impedance tuner and an aperture tuner, wherein a single pole multi-throw, a multi-pole multi-throw, a multi-pole single throw, a multi-pole multi-throw or a switch with variable capacitor may be used in the at least one of the impedance tuner and the aperture tuner. In some embodiments, each antenna state corresponds to a corresponding circuit, wherein when the switch circuit switches to the current antenna state, the corresponding circuit of the current antenna state is enabled.

An embodiment of the invention provides user equipment (UE) for a specific absorption rate (SAR). The UE may comprise a radio frequency (RF) circuit, a memory device and a processor. The memory device may store a back-off table. The processor is coupled to the RF circuit and the memory device. The processor determines a back-off value corresponding to a current antenna state, and tunes the conducted power of the RF circuit of the UE based on the back-off value.

Other aspects and features of the invention will become apparent to those with ordinary skill in the art upon review of the following descriptions of specific embodiments of the dynamic tuning method and UE for the SAR.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
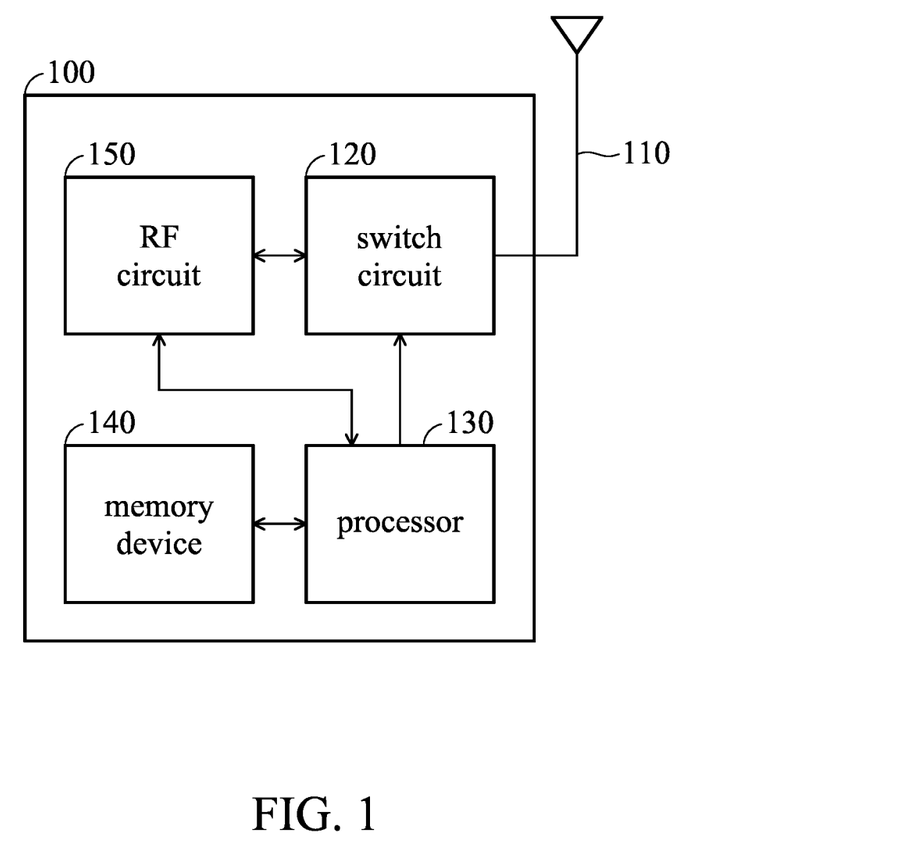
FIG. 1 is a block diagram of a UE according to an embodiment of the invention.

FIG. 1 is a block diagram of a UE 100 according to an embodiment of the invention. As shown in FIG. 1, the UE 100 may comprise an antenna circuit 110, a switch circuit 120, a processor 130, a memory device 140 and a radio frequency (RF) circuit 150. It should be noted that, in order to clarify the concept of the invention, FIG. 1 presents a simplified block diagram in which only the elements relevant to the invention are shown. However, the invention should not be limited to what is shown in FIG. 1. In the embodiments of the invention, the antenna circuit 110 and the switch circuit 120 may be combined or integrated in the same circuit.

In the embodiments of the invention, the UE 100 may be a smartphone, a Personal Data Assistant (PDA), a pager, a laptop computer, a desktop computer, a wireless handset, or any computing device that includes a wireless communications interface.

In the embodiments of the invention, the antenna circuit 110 may receive signals from the network node and transmit signals to the network node. The antenna circuit 110 may comprise one or more antennas.

Figure 2A:
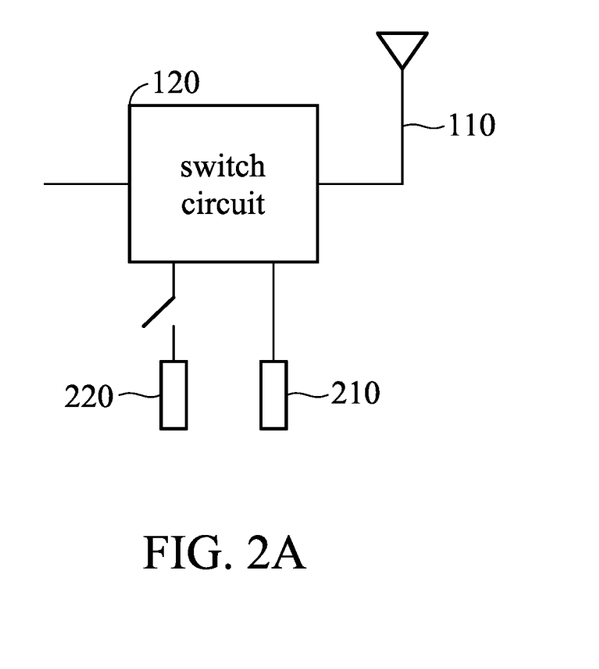
FIGS. 2A-2B are schematic diagrams illustrating the circuits corresponding to different switch states according to an embodiment of the invention.
Figure 2B:
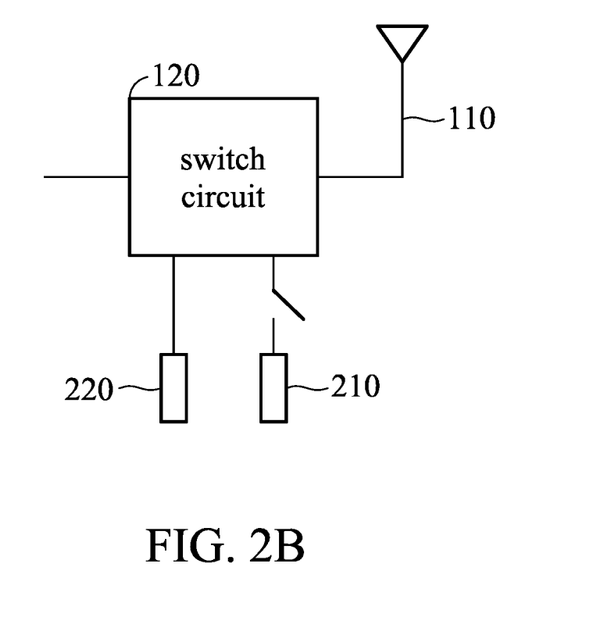

In the embodiments of the invention, the switch circuit 120 may comprise at least one of an impedance tuner and an aperture tuner, wherein a single pole multi-throw, a multi-pole multi-throw, a multi-pole single throw, a multi-pole multi-throw or a switch with variable capacitor may be used in the at least one of the impedance tuner and the aperture tuner, but the invention should not be limited thereto. The switch circuit 120 may switch to an antenna state based on the indication or information from the processor 130. According to an embodiment of the invention, each antenna state may correspond to a corresponding circuit. The switch circuit 120 may dynamically switch to an antenna state by switching to the circuit corresponding to the antenna state. Taking FIG. 2A-2B as an example, the circuit 210 corresponds to antenna state CW1 and the circuit 220 corresponds to antenna state CW2. As shown in FIG. 2A, when the switch circuit 120 switches to the antenna state CW1, the circuit 210 will be enabled. As shown in FIG. 2B, when the switch circuit 120 switches to the antenna state CW2, the circuit 220 will be enabled. In an example, the circuit 210 and the circuit 220 may respectively comprise an inductor with different values, but the invention should not be limited thereto.

In the embodiments of the invention, the processor 130 may control the operations of the switch circuit 120, the memory device 140 and the RF circuit 150. According to an embodiment of the invention, the processor 130 may also be arranged to execute the program codes of the software modules. The program codes accompanied by specific data in a data structure may also be referred to as a processor logic unit or a stack instance when being executed. Therefore, the processor 130 may be regarded as being comprised of a plurality of processor logic units, each for executing one or more specific functions or tasks of the corresponding software modules.

In the embodiments of the invention, the memory device 140 may store the software and firmware program codes, system data, user data, etc. of the UE 100. The memory device 140 may be a volatile memory such as a random access memory (RAM); a non-volatile memory such as a flash memory or a read-only memory (ROM); a hard disk; or any combination thereof. The memory device 140 may store the data and information for the absorption rate (SAR). According to an embodiment of the invention, the memory 140 may pre-store a back-off table.

In the embodiments of the invention, the RF circuit 150 may process the received RF signals to convert the received RF signals to baseband signals, or receive baseband signals and convert the received baseband signals to RF signals. The RF circuit 150 may comprise a plurality of hardware elements to perform radio frequency conversion. For example, the RF circuit 150 may comprise a power amplifier, a mixer, an analog-to-digital converter (ADC) and a digital-to-analog converter (DAC), but the invention should not be limited thereto. According to an embodiment of the invention, the UE 100 may tune the conducted power of the RF circuit 150 based on the back-off value corresponding to the current antenna state.

According to an embodiment of the invention, the back-off table pre-stored in the memory device 140 may record each back-off value corresponding to each antenna state. The processor 130 may select an antenna state based on the current environment. Then, the processor may determine a back-off value corresponding to the current antenna state (i.e., selected antenna state) based on the back-off table. In addition, the processor 130 may tune the conducted power of the RF circuit 150 based on the back-off value corresponding to the current antenna state (i.e., selected antenna state) to maintain transmission performance of the UE 100. That is to say, for different antenna states, the UE 100 may tune the conducted power of the RF circuit 150 based on the different back-off values that correspond to the respective antenna states to make sure that the UE 100 can maintain the transmission performance (e.g., the total radiated power (TRP) value) of the UE 100 and meet the SAR requirements of the SAR regulation in different antenna states.

For example, as shown in Table 1, the UE 100 may tune the conducted powers corresponding to the antenna state CW1, antenna state CW2 and antenna state CW3 based on the back-off values corresponding to the antenna state CW1, antenna state CW2 and antenna state CW3. Therefore, the UE 100 can maintain the transmission performance (e.g., the total radiated power (TRP) value) of the UE 100 in different antenna states. In addition, the SAR value can achieve the maximum of the SAR limitation without exceeding the SAR requirements of the SAR regulation in different antenna states.

TABLE 1

|  | antenna state CW1 | antenna state CW2 | antenna state CW3 |
| --- | --- | --- | --- |
| antenna efficiency | −4 dB | −5 dB | −6 dB |
| SAR value | 1.5 W/kg | 1.5 W/kg | 1.5/kg |
| conducted power | 18 dBm | 19 dBm | 20 dBm |
| back-off value | 6 dBm | 5 dBm | 4 dBm |
| TRP value | 14 dBm | 14 dBm | 14 dBm |

According to an embodiment of the invention, the back-off values in the back-off table may be determined based on a SAR LAB test. Specifically, during the creation of back-off table, different usage scenarios (or user interface (UI) characters) will be detected. The usage scenarios may comprise that the UE approaches head, the UE is held in the left hand, the UE is held in the right hand, but the invention should not be limited thereto. Each usage scenario may correspond to one or more antenna states. In an embodiment, each usage scenario may correspond to a threshold. When the antenna state is smaller than threshold, the antenna state will be selected for the usage scenario. Taking Table 2 for example, the antenna state CW2, antenna state CW4 and antenna state CW6 may be selected from a plurality of antenna states for a certain usage scenario.

According to an embodiment of the invention, the SAR LAB test may be performed on these selected antenna state CW2, antenna state CW4 and antenna state CW6 for the certain usage scenario. In the SAR LAB test, the back-off values corresponding to the selected antenna states will be determined to meet the maximum (e.g., 1.5W/kg) of the SAR limitation. Accordingly, the back-off table is established based on the back-off values and pre-stored in the UE 100.

TABLE 2

|  | antenna state CW2 | antenna state CW4 | antenna state CW6 |
| --- | --- | --- | --- |
| antenna efficiency | −4 dB | −5 dB | −6 dB |
| SAR value | 1.5 W/kg | 1.5 W/kg | 1.5/kg |

TABLE 2-continued

|  | antenna state CW2 | antenna state CW4 | antenna state CW6 |
|---|---|---|---|
| conducted power | 18 dBm | 19 dBm | 20 dBm |
| back-off value | 6 dBm | 5 dBm | 4 dBm |
| TRP value | 14 dBm | 14 dBm | 14 dBm |

According to another embodiment of the invention, a back-off value of an antenna state with the best antenna performance (e.g., the first antenna state corresponds to the best total radiated power (TRP) value) within the selected antenna states (e.g., selected antenna state CW2, antenna state CW4 and antenna state CW6) is determined based on the SAR LAB test. That is to say, the SAR LAB test is only performed for the antenna state with the best antenna performance. After the back-off value (regarded as a golden value) of the antenna state with the best antenna performance is obtained in the SAR LAB test, other back-off values of other selected antenna states may be determined or derived based on the back-off value. In addition, in the embodiment, if the derived back-off value is wrong or inappropriate, e.g., based on the derived back-off value, the SAR value may be over the maximum of the SAR limitation, the antenna state corresponding to the wrong back-off value may be performed SAR LAB test to obtain the appropriate back-off value.

Figure 3:
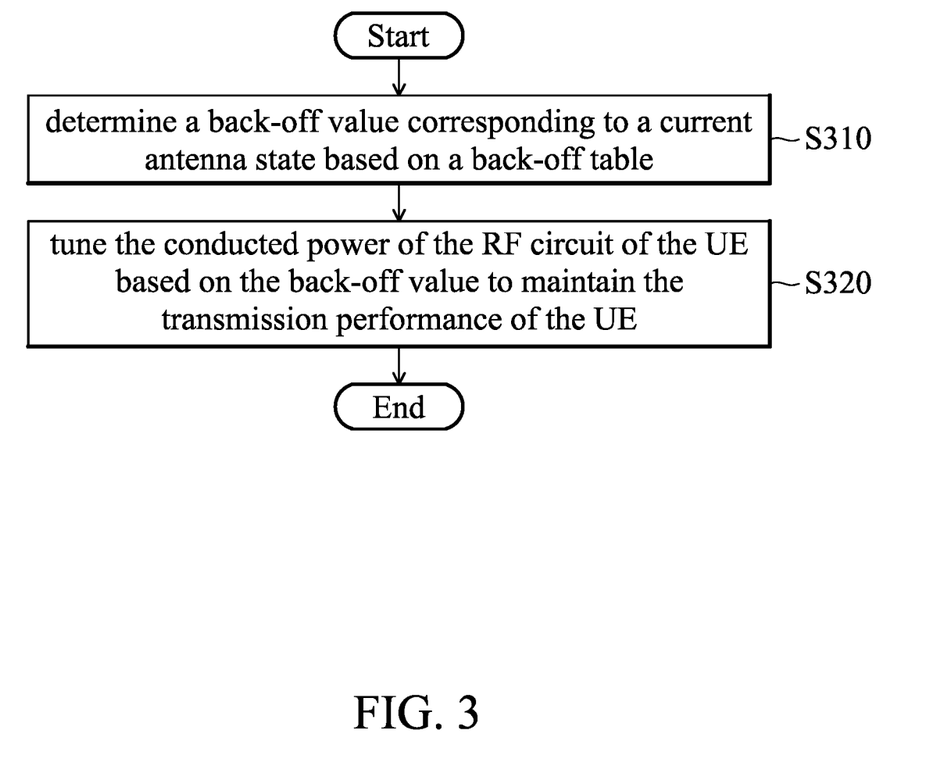
FIG. 3 is a flow chart illustrating a dynamic tuning method for specific absorption rate (SAR) according to an embodiment of the invention.

FIG. 3 is a flow chart illustrating a dynamic tuning method for a specific absorption rate (SAR) according to an embodiment of the invention. The dynamic tuning method can be applied to the UE 100. As shown in FIG. 3, in step S310, the UE 100 may determine a back-off value corresponding to a current antenna state based on a back-off table. In the dynamic tuning method, different antenna states may correspond to different back-off values. The back-off table may record each back-off value corresponding to each antenna state. The back-off table is stored in a memory device of the UE.

In step S320, the UE 100 may tune the conducted power of the radio frequency (RF) circuit of the UE based on the back-off value to maintain the transmission performance of the UE.

Figure 4:
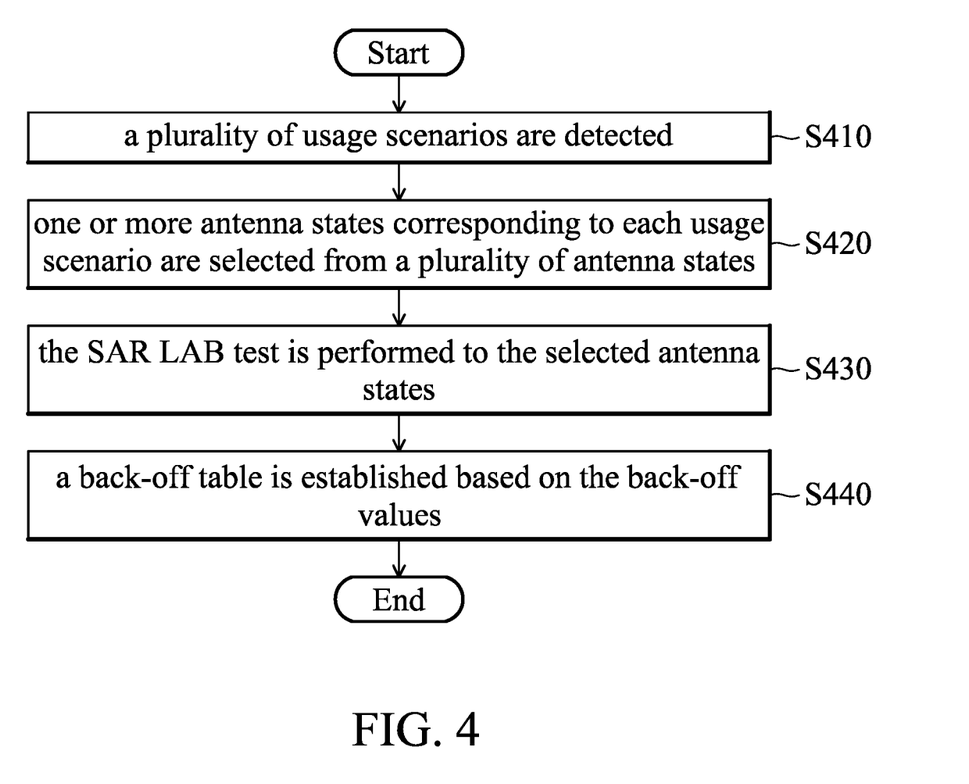
FIG. 4 is a flow chart illustrating a back-off table creation method according to an embodiment of the invention.

FIG. 4 is a flow chart illustrating a back-off table creation method according to an embodiment of the invention. In step S410, a plurality of usage scenarios (or user interface (UI) characters) are detected.

In step S420, one or more antenna states corresponding to each usage scenario are selected from a plurality of antenna states.

In step S430, for each usage scenario, the SAR LAB test is performed to the selected antenna states. In the SAR LAB test, the back-off values corresponding to the selected antenna states will be determined to meet the maximum (e.g., 1.5W/kg) of the SAR limitation.

In step S440, a back-off table is established based on the back-off values.

Figure 5:
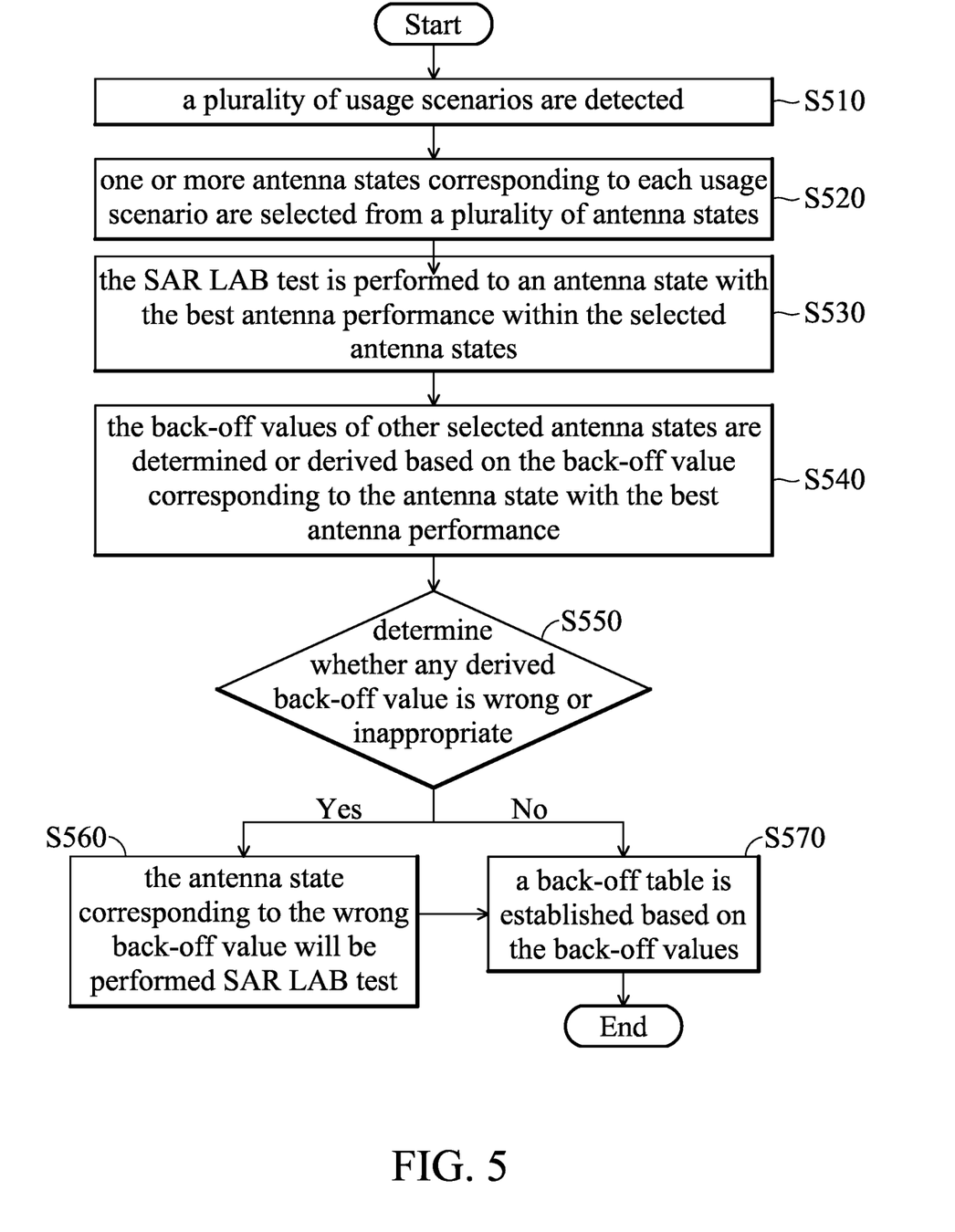
FIG. 5 is a flow chart illustrating a back-off table creation method according to another embodiment of the invention.

FIG. 5 is a flow chart illustrating a back-off table creation method according to another embodiment of the invention. In step S510, a plurality of usage scenarios (or user interface (UI) characters) are detected.

In step S520, one or more antenna states corresponding to each usage scenario are selected from a plurality of antenna states.

In step S530, for each usage scenario, the SAR LAB test is performed to an antenna state with the best antenna performance (e.g., a first antenna state corresponds to the best total radiated power (TRP) value) within the selected antenna states. In the SAR LAB test, the back-off value corresponding to the antenna state with the best antenna performance will be determined to meet the maximum (e.g., 1.5W/kg) of the SAR limitation.

In step S540, for each usage scenario, the back-off values of other selected antenna states are determined or derived based on the back-off value corresponding to the antenna state with the best antenna performance.

In step S550, it is determined whether any derived back-off value is wrong or inappropriate, e.g., based on the derived back-off value, the SAR value may be over the maximum of the SAR limitation. If there is any derived back-off value is wrong or inappropriate, step S560 is performed. In step S560, the antenna state corresponding to the wrong back-off value will be performed SAR LAB test to obtain the appropriate back-off value.

If there is no derived back-off value is wrong or inappropriate, step S570 is performed. In step S570, a back-off table is established based on the back-off values.

In the dynamic tuning method for SAR provided in the invention, the UE can tune the conducted power of a radio frequency (RF) circuit of the UE based on the back-off value corresponding to a current antenna state to maintain the transmission performance of the UE without exceeding the SAR requirements of the SAR regulation. Therefore, in the dynamic tuning method for SAR provided in the invention, the user may have better user experience.

Use of ordinal terms such as "first", "second", "third", etc., in the disclosure and claims is for description. It does not by itself connote any order or relationship.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in the UE. In the alternative, the processor and the storage medium may reside as discrete components in the UE. Moreover, in some aspects, any suitable computer-program product may comprise a computer-readable medium comprising codes relating to one or more of the aspects of the disclosure. In some aspects, a computer software product may comprise packaging materials.

It should be noted that although not explicitly specified, one or more steps of the methods described herein can include a step for storing, displaying and/or outputting as required for a particular application. In other words, any data, records, fields, and/or intermediate results discussed in the methods can be stored, displayed, and/or output to another device as required for a particular application. While the foregoing is directed to embodiments of the present invention, other and further embodiments of the invention can be devised without departing from the basic scope thereof. Various embodiments presented herein, or portions thereof, can be combined to create further embodiments.

The above description is of the best-contemplated mode of carrying out the invention. This description is made for the purpose of illustrating the general principles of the invention and should not be taken in a limiting sense. The scope of the invention is best determined by reference to the appended claims.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A dynamic tuning method for a specific absorption rate (SAR), applied to a user equipment (UE), comprising:
    determining, by a processor of the UE, a back-off value corresponding to a current antenna state; and
    tuning, by the processor, a conducted power of a radio frequency (RF) circuit of the UE based on the back-off value of the UE.

2. The dynamic tuning method of claim 1, wherein different back-off values correspond to different antenna states.

3. The dynamic tuning method of claim 1, wherein the back-off value is determined based on a back-off table recording each back-off value corresponding to each antenna state.

4. The dynamic tuning method of claim 1, wherein the transmission performance comprises a total radiated power (TRP) value.

5. The dynamic tuning method of claim 1, wherein each usage scenario corresponds to one or more antenna states.

6. The dynamic tuning method of claim 5, wherein the back-off values of the one or more antenna states are determined based on a SAR LAB test.

7. The dynamic tuning method of claim 5, wherein a first back-off value of a first antenna state with the best antenna performance within the one or more antenna states is determined based on a SAR LAB test, and other back-off values of other antenna states of the one or more antenna states are determined based on the first back-off value.

8. The dynamic tuning method of claim 2, further comprising:
    switching, by a switch circuit of the UE, to the current antenna state.

9. The dynamic tuning method of claim 8, wherein the switch circuit comprises at least one of an impedance tuner and an aperture tuner.

10. The dynamic tuning method of claim 8, wherein each antenna state corresponds to a corresponding circuit, wherein when the switch circuit switches to the current antenna state, the corresponding circuit of the current antenna state is enabled.

11. A user equipment (UE), comprising:
    a radio frequency (RF) circuit; and
    a processor, coupled to the RF circuit, determining a back-off value corresponding to a current antenna state, and tuning a conducted power of the RF circuit of the UE based on the back-off value.

12. The UE of claim 11, wherein different back-off values correspond to different antenna states.

13. The UE of claim 11, wherein the processor determines the back-off value based on a back-off table stored in a memory device and the back-off table records each back-off value corresponding to each antenna state.

14. The UE of claim 11, wherein the transmission performance comprises a total radiated power (TRP) value.

15. The UE of claim 11, wherein each usage scenario corresponds to one or more antenna states.

16. The UE of claim 15, wherein the back-off values of the one or more antenna states are determined based on a SAR LAB test.

17. The UE of claim 15, wherein a first back-off value of a first antenna state with the best antenna performance within the one or more antenna states is determined based on a SAR LAB test, and other back-off values of other antenna states of the one or more antenna states are determined based on the first back-off value.

18. The UE of claim 2, further comprising:
    a switch circuit, switching to the current antenna state.

19. The UE of claim 18, wherein the switch circuit comprises at least one of an impedance tuner and an aperture tuner.

20. The UE of claim 18, wherein each antenna state corresponds to a corresponding circuit, wherein when the switch circuit switches to the current antenna state, the corresponding circuit of the current antenna state is enabled.

* * * * *